United States Patent [19]

Nakamura et al.

[11] Patent Number: 4,991,806

[45] Date of Patent: Feb. 12, 1991

[54] SUCTION MOUNTED CLIP

[76] Inventors: Jeffrey M. Nakamura, 321 N. Kuakini St., Suite 412; Denny Kwock, 321 N. Kuakini St., Suite 412, both of Honolulu, Hi. 96817

[21] Appl. No.: 256,755

[22] Filed: Oct. 12, 1988

[51] Int. Cl.$^5$ .............................................. F16B 47/00
[52] U.S. Cl. ................................ 248/206.2; 248/316.7
[58] Field of Search ............... 248/205.5, 206.2, 206.3, 248/206.4, 316.7; 24/546, 551, 552, 555, 563; 40/643, 644, 661

[56] References Cited

U.S. PATENT DOCUMENTS

| | | |
|---|---|---|
| 253,392 | 2/1882 | Jones et al. . |
| 1,121,086 | 12/1914 | Gedney .............................. 24/563 X |
| 1,483,640 | 2/1924 | Manning . |
| 1,575,789 | 3/1926 | Phelps . |
| 1,632,856 | 6/1927 | Running . |
| 1,645,229 | 10/1927 | Churonusi . |
| 1,683,645 | 9/1928 | Abbey . |
| 1,739,801 | 12/1929 | Pitts . |
| 1,839,694 | 1/1932 | Nelson et al. . |
| 2,451,194 | 10/1948 | Braun ............................ 248/205.3 X |
| 2,478,376 | 8/1949 | Swart ................................. 24/562 X |
| 2,574,144 | 11/1951 | Engstrom ......................... 24/562 X |
| 2,717,717 | 9/1955 | Busch ........................... 248/205.5 X |
| 3,168,276 | 2/1965 | Schneider .................... 248/316.7 X |
| 3,312,439 | 4/1967 | Swee ............................. 248/205.5 X |
| 3,338,293 | 8/1967 | Hohmann .................... 248/205.5 X |
| 4,279,396 | 7/1981 | Bendock . |
| 4,413,434 | 11/1983 | Rupert ................................. 40/661 |
| 4,648,572 | 3/1987 | Sokol . |
| 4,833,751 | 5/1989 | Iwase ............................... 24/563 X |

Primary Examiner—J. Franklin Foss
Attorney, Agent, or Firm—James C. Wray

[57] ABSTRACT

A knob on a round suction cup is mounted in an opening in the back of a bow portion of a clip, away from the nip section. A roller on the nip cooperates with a flat sliding surface, another roller or a groove to receive and hold a card. Printing on the suction cup or on a sticker which receives the suction cup is visible through a transparent windshield.

17 Claims, 2 Drawing Sheets

SUCTION MOUNTED CLIP

BACKGROUND OF THE INVENTION

It is useful to mount a parking pass on a windshield of a car so that the parking pass is visible through the windshield. One common form of mounting is to construct the pass with a hole and slit for hanging on the mirror post. When the pass must be removed and replaced repeatedly, the slit may enlarge, allowing the pass to drop.

A two-part identification may be desirable in which one part is permanently mounted on the windshield and in which another part is visible through a windshield. Mirror hang cards do not provide that function.

Other suction cup clip devices have the disadvantages of complexities of construction or use which make them unsatisfactory for the desired object of the invention.

SUMMARY OF THE INVENTION

A knob on a round suction cup is mounted in an opening in the back of a bow portion of a clip, away from the nip section. A roller on the nip cooperates with a flat sliding surface, another roller or a groove to receive and hold a card. Printing on the suction cup or on a sticker which receives the suction cup is visible through a transparent windshield.

A preferred suction cup mounted clip apparatus includes a suction cup having a resilient body with a depressed portion surrounded by a rim for contacting a mounting plane. Forcing air out of the depression past the rim as the body is moved toward the plane and resiliently reforming and reducing pressure in the depression holds the body on the mounting plane. A knob extends from the body at a portion thereof opposite the rim. A clip has a generally planar back portion and a curved front portion. The curved front portion has a bow section extending outward from one end of the back portion, extending opposite the back portion and spaced therefrom and extending inward toward the back portion to a nip section of the front portion which is adjacent the back portion. The front portion further has a receiver section which extends outward from the nip section to an outer distal edge remote from an adjacent section of the back portion. A portion of a planar article may be slipped between the receiver section the back portion and between the nip section and back portion and may be held in the clip by the nip section. The back portion has an opening in a section thereof opposite the bow section for receiving the knob of the suction cup. The knob of the suction cup is resiliently compressed and inserted through the opening and is expanded on a side of the back portion toward the bow section.

Preferably, the back portion of the clip is relatively wide, and the front portion of the clip tapers inwardly from the bow section to the nip section.

In a preferred embodiment, the back portion and front portion of the clip are elongated in a uniform direction. A roller is rotatably mounted on one of the portions near the nip section to provide roller contact in the nip section.

Preferably, the roller is mounted on the nip section of the front portion.

In a preferred embodiment, the roller is mounted on an axle which extends transverse to an elongated direction of the back and front portions of the clip.

In one embodiment, a portion of the roller fits within a matching groove in the back portion.

In another embodiment, a second roller is mounted on a second axle on the back portion adjacent and parallel to the axle mounted on the nip section, for contacting between the opposite rollers a planar article inserted between the back and nip section.

In a preferred embodiment, a reverse reading sticker had a first sticky side. Information on the sticker is legible through the first sticky side and is legible through a transparent planar mounting media. The suction cup is mounted on the sticker. Preferably, a second sticky side on the sticker contacts the suction cup.

In one preferred embodiment, print media is in the depression of the suction cup for reading through a transparent mounting plane.

In another embodiment, a second suction cup has a knob, and a second opening extends through a laterally extended back portion for receiving the knob of the second suction cup.

These and other and further objects and features of the invention are apparent in the disclosure which includes the above and ongoing specification and claims and drawings.

DETAILED DESCRIPTION OF THE DRAWINGS

Figure 1:
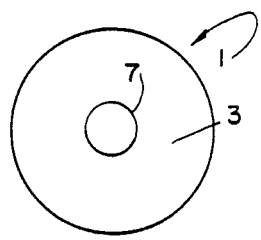
FIG. 1 is a front elevational view of a suction cup used in the present invention.
Figure 2:
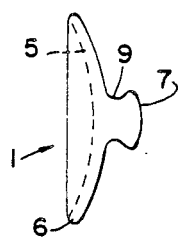
FIG. 2 is a side elevational view of the suction cup shown in FIG. 1.

Referring to FIGS. 1 and 2, suction cup 1 has a body 3 with a depression 5 which is deformable. A knob 7 has a groove 9. A rim 6 surrounds depression 5.

Figure 3:
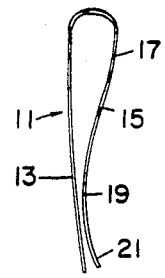
FIG. 3 is a side elevational view of a clip used in the present invention.
Figure 4:
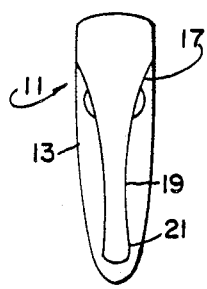
FIG. 4 is a front elevational view of the clip shown in FIG. 3.
Figure 5:
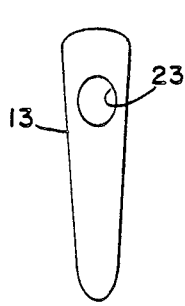
FIG. 5 is a rear elevational view of the clip shown in FIG. 3.

As shown in FIGS. 3-5, a clip 11 has a back portion 13 and a front portion 15, with a bow section 17, a nip section 19 and a receiver section 21. A hole 23 is laterally centered in the back portion 13 opposite the bow section 17 of the front portion 15. The hole 23 receives groove 9 after knob 7 has been resiliently squeezed through the hole.

Figure 6:
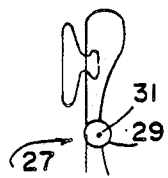
FIG. 6 is a side elevational view of a preferred suction cup mounted windshield clip showing a single pinching roller at the nip.
Figure 11:
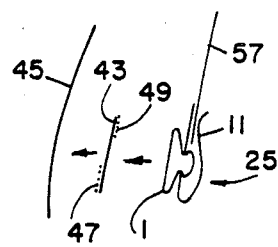
FIG. 11 is a schematic view of a sticker imposed between a clip and a windshield.

The combined suction cup and clip 25 is shown in FIG. 11. A modified form of the invention 27 is shown in FIG. 6. In FIG. 6, a single pinching roller 29 is mounted on an axle 31 in the nip section of the front portion of the clip.

Figure 8:
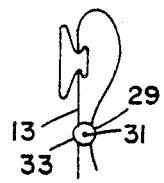
FIG. 8 is an alternate form of the invention as shown in FIG. 6 showing a groove which enhances the clipping action of the single roller shown in FIG. 6.
Figure 9:
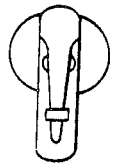
FIG. 9 is a front elevation of the clip shown in FIG. 6.

As shown in FIG. 8, a groove 33 is provided in the rear portion 13 opposite the roller 29 to enhance the clipping action of the roller.

Figure 7:
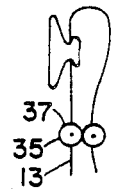
FIG. 7 is a detail of an alternate form of the invention showing a double pinching roller at the nip.

As shown in FIG. 7, a second roller 35 is mounted on an axle 37 which is held in the rear portion 13.

The groove portion 33 shown in FIG. 8 may be a cut-out portion or may be a curved depressed section of the rear portion 13.

Figure 10:
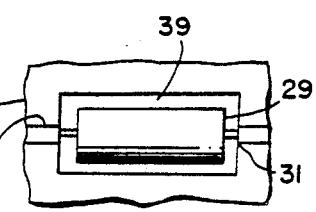
FIG. 10 is a detail of one roller mounting.

As shown in the detail of FIG. 10, roller 29 and axle 31 are mounted within an opening 39 in the nip section 19 of the front portion of the clip. Enlarged portions 41 hold the axle 31.

In a preferred form of the invention as shown in FIG. 11, a sticker 43 having informational printing thereon is mounted on a windshield 45 with a transparent adhesive 47. An adhesive 49 may also be provided on the side facing the suction cup 1. The adhesive 49 on the side of the sticker 43 facing the suction cup may be used to adhere the rim of the suction cup to the windshield or may be used to adhere a soft flattened suction cup body to the windshield.

Figure 12:
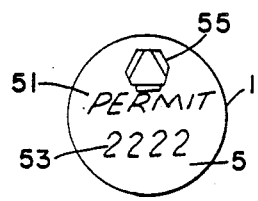
FIG. 12 is a detail of a printed suction cup.

As shown in FIG. 12, the central depression 5 of suction cup 1 may be printed with words 51, numerals 53 and/or identifying indicia 55 to cooperate with the pass 57 held in the clip 11 shown in FIG. 11.

The suction cup with a knob is generally obtainable as an item of commerce. The clip with a hole for receiving the knob is preferably made from clear or tinted polycarbonate or from stainless steel or aluminum.

The sticker shown in FIG. 11 is mounted on a release sheet for removal prior to attachment to the window. In the case of double coated stickers, the stickers are provided between two release sheets. Preferably, the window side release sheet is first removed, and the sticker is pressed against the window. Subsequently, the suction cup side release sheet is removed, and the suction cup is pressed against the sticker. The mounting system functions if only the rim portion or a portion of the cup immediately inward from the rim portion is attached to the adhesive on the sticker.

Figure 13:
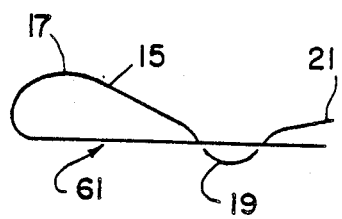
FIG. 13 is a sideview of an alternate form of the clip used in the invention.
Figure 14:
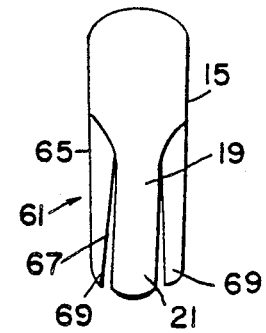
FIG. 14 is a front elevational view of the clip shown in FIG. 13.
Figure 15:
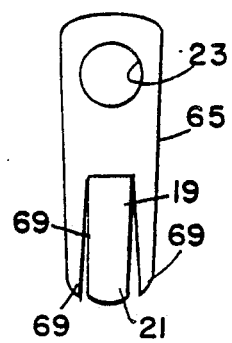
FIG. 15 is a rear elevational view of the clip shown in FIG. 13.
Figure 16:
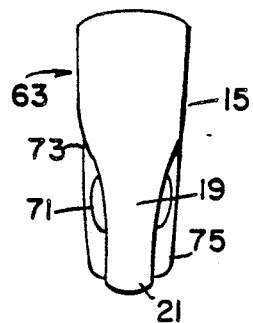
FIG. 16 is a front elevational view of an alternate form of the clip.
Figure 17:
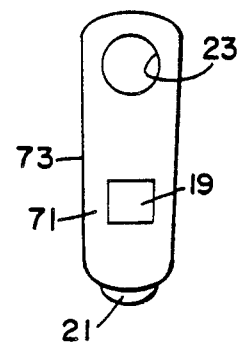
FIG. 17 is a rear elevational view of the clip shown in FIG. 16.
Figure 18:
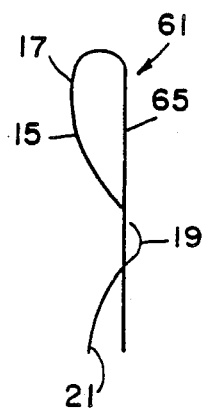
FIG. 18 is a side elevational view of the clip shown in FIGS. 16 and 17.

The modifications of the invention shown in FIGS. 13-18 are particularly useful in enhancing the clipping action, especially when the devices are made of very thin resilient materials. In both embodiments the clipping coverature of the front portion of the clip extends into an opening in the rear portion of the clip. In FIGS. 13-15 the opening in the rear portion of the clip extends downward through the lower edge of the clip, creating a bifurcated rear portion of the clip. In the embodiments shown in FIGS. 16-18, the opening in the rear portion of the clip is confined to that section of the rear portion which is directly opposite the curved medial clipping section of the front portion of the clip. In both clips 61 and 63, a hole 23 is provided in an upper section of the back portion to receive a knob 7 of a section cup 1 as shown in FIGS. 1 and 2. The front portion 15 has an upper body section 17 which is spaced from the back portion and a lower end 21 which is spaced from the back portion and a medial reentrantly curved portion 19 which extends through an opening in the back portion. As shown in FIG. 14, the back portion 65 of clip 61 has an elongated opening 67 which results in bifurcated legs 69 of the back portion. The tip section 21 of the front portion is spaced upward from the ends of bifurcated legs 69 and the curved medial portion 19 extends inward through opening 67. In FIG. 16, the front portion 15 has essentially the same shape. The reentrantly curved middle section 19 of the front portion 15 fits within an opening 71 in the back portion 73. As a paper or card is slid between the solid lower portion 75 of the back portion 65 and the spaced edge 21 of the front portion 15, the front portion is lifted allowing the card or paper to move upward. The curved section 19 of the front portion to urge the card or paper partially into opening 71 63 or opening 67 in clip 61, thus tightly gripping the paper or the card until it is intentionally removed from the clip.

The entire system functions to coordinate permanent and changeable information in one unit. The system provides ease of insertion of articles such as parking passes, stubs or notes with one hand in a convenient suction mounted clip.

While the invention has been described with reference to specific embodiments, modifications and variations may be constructed without departing from the scope of the invention which is defined in the following claims.

We claim:

1. A suction cup mounted clip apparatus comprising a suction cup having a resilient body with a depressed portion surrounded by a rim for contacting a mounting plane and for forcing air out of the depression past the rim as the body is moved toward the plane and for resiliently reforming and reducing pressure in the depression and holding the body on the mounting plane, a knob extending from the body at a portion thereof opposite the rim, a clip having a generally planar back portion and a curved front portion, the curved front portion having a bow section extending outward from one end of the back portion, extending opposite the back portion and spaced therefrom and extending inward toward the back portion to a nip section of the front portion which is adjacent the back portion, the front portion further having a receiver section which extends outward from the nip section to an outer distal edge remote from an opposite section of the back portion, whereby a portion of a planar article may be slipped between the receiver section and the back portion and between the nip section and back portion and may be held in the clip by the nip section, the back portion having an opening in a section thereof opposite the bow section for receiving the knob of the suction cup and the knob of the suction cup being resiliently compressed and inserted through the opening and expanded on a side of the back portion toward the bow section, further comprising a reverse reading sticker adjacent the rim of the suction cup, for interposing between the rim of suction cup and the mounting plane, the sticker having a first sticky side and information on the sticker legible through the first sticky side and legible through a transparent planar mounting media.

2. The apparatus of claim 1 wherein the back portion of the clip is relatively wide and the front portion of the clip tapers inwardly from the bow section to the nip section.

3. The apparatus of claim 1 wherein the back portion and front portion of the clip are elongated in a uniform direction and further comprising a roller rotatably mounted on one of the portions near the nip section to provide roller contact in the nip section.

4. The apparatus of claim 3 wherein the roller is mounted on the nip section of the front portion.

5. The apparatus of claim 4 wherein the roller is mounted on an axle which extends transverse to an elongated direction of the back and front portions of the clip.

6. The apparatus of claim 5 wherein a portion of the roller fits within a matching groove in the back portion.

7. The apparatus of claim 6 further comprising a second roller mounted on a second axle on the back portion adjacent and parallel to the axle mounted on the nip section.

8. The apparatus of claim 3 further comprising a second roller mounted on the opposite portion adjacent the nip section for contacting between the opposite rollers a planar article inserted between the back and nip section.

9. The apparatus of claim 1 further comprising a second sticky side on the sticker for contacting the suction cup.

10. A suction cup mounted clip apparatus comprising a suction cup having a resilient body with a depressed portion surrounded by a rim for contacting a mounting plane and for forcing air out of the depression past the rim as the body is moved toward the plane and for resiliently reforming and reducing pressure in the depression and holding the body on the mounting plane, a knob extending from the body at a portion thereof opposite the rim, a clip having a generally planar back portion and a curved front portion, the curved front portion having a bow section extending outward from one end of the back portion, extending opposite the back portion and spaced therefrom and extending inward toward the back portion to a nip section of the front portion which is adjacent the back portion, the front portion further having a receiver section which extends outward from the nip section to an outer distal edge remote from an opposite section of the back portion, whereby a portion of a planar article may be slipped between the receiver section and the back portion and between the nip section and back portion and may be held in the clip by the nip section, the back portion having an opening in a section thereof opposite the bow section for receiving the knob of the suction cup and the knob of the suction cup being resiliently compressed and inserted through the opening and expanded on a side of the back portion toward the bow section, further comprising print media in the depression of the suction cup for reading through a transparent mounting plane.

11. The apparatus of claim 10 wherein the nip section of the front portion extends into a nip-receiving opening in the rear portion for gripping paper between the nip section and sections of the rear portion surrounding the nip-receiving opening.

12. The apparatus of claim 11 wherein the nip receiving opening extends along the back portion from a position opposite the nip section to an end of the back portion opposite the receiver section on the front portion, thereby forming bifurcated legs on the rear portion, whereby the nip section tends to partially deform papers or cards held between the nip section into the opening between the bifurcated legs.

13. The apparatus of claim 11 when the nip receiving opening comprises an opening in the back portion which is surrounded by lateral edge sections of a medial section of the back portion and opposite spaced edges of the back portion.

14. The apparatus of claim 12 wherein the nip receiving opening is generally rectangular.

15. A suction cup mounted clip apparatus comprising a resilient suction cup body with a suction cup at one side and a knob at the other side, a clip having a generally planar portion with a first opening which receives the knob of the suction cup and having a second elongated opening, spaced from and aligned with the first opening, an elongated front portion connected to the planar portion and extending into the second opening and having a curved transverse nip section extending through the second opening and having a free tip section positioned above the planar portion on a side thereof remote from the suction cup whereby sheet material to be held by the clip may be slid under the tip section for raising the nip section from the second opening and sliding the sheet material between the nip section and the second opening, further comprising a reverse reading sticker adjacent the rim of the suction cup, for interposing between the rim of the suction cup and the mounting plane, the sticker having a first sticky side and information on the sticker legible through the first sticky side and legible through a transparent planar mounting media.

16. The apparatus of claim 15 wherein the planar portion has a mounting section which has the first opening and parallel leg sections connected to the mounting section and extending generally parallel to the nip section and tip section of the front portion.

17. The apparatus of claim 16 wherein the front portion comprises a curved front portion with a downward curved section extending from the tip section to the nip section and an upward curved section extending from the nip section toward the connection of the front portion with the planar portion.

* * * * *